(12) United States Patent
Demchenko

(10) Patent No.: US 9,996,702 B2
(45) Date of Patent: Jun. 12, 2018

(54) SYSTEM FOR AND METHOD OF DATA PROCESSING IN A COMPUTER-IMPLEMENTED SYSTEM

(71) Applicant: YANDEX EUROPE AG, Lucerne (CH)

(72) Inventor: Grigory Victorovich Demchenko, Moscow (RU)

(73) Assignee: YANDEX EUROPE AG, Lucerne (CH)

( * ) Notice: Subject to any disclaimer, the term of this patent is extended or adjusted under 35 U.S.C. 154(b) by 85 days.

(21) Appl. No.: 15/262,353

(22) Filed: Sep. 12, 2016

(65) Prior Publication Data

US 2017/0091468 A1    Mar. 30, 2017

(30) Foreign Application Priority Data

Sep. 28, 2015    (RU) .................................. 2015141102

(51) Int. Cl.
G06F 21/62        (2013.01)
G06F 21/55        (2013.01)
G06F 21/53        (2013.01)

(52) U.S. Cl.
CPC .......... *G06F 21/6209* (2013.01); *G06F 21/53* (2013.01); *G06F 21/556* (2013.01)

(58) Field of Classification Search
CPC ..... G06F 21/53; G06F 21/556; G06F 21/6209
See application file for complete search history.

(56) References Cited

U.S. PATENT DOCUMENTS

| 6,836,888 | B1 | 12/2004 | Basu et al. |
| 7,908,653 | B2 | 3/2011 | Brickell et al. |
| 8,180,891 | B1 | 5/2012 | Harrison |
| 8,364,959 | B2 | 1/2013 | Bhanoo et al. |
| 8,627,451 | B2 | 1/2014 | Walsh |
| 8,892,601 | B2 | 11/2014 | Greenberg et al. |
| 9,027,151 | B2 | 5/2015 | Walsh |

(Continued)

FOREIGN PATENT DOCUMENTS

| RU | 2460133 C1 | 8/2012 |
| RU | 2535175 C2 | 12/2014 |

OTHER PUBLICATIONS

Russian Search report from RU 2015141102 dated Aug. 31, 2016.

*Primary Examiner* — Dao Q Ho
(74) *Attorney, Agent, or Firm* — BCF LLP

(57) ABSTRACT

A computer-implemented system for processing a user device request to process a user data portion, the system comprising a server having a processor, the processor having a user space and a kernel space, the processor configured to perform receiving the request to process the user data portion from a user device, reading the user data portion from a database at the server, allocating space at the processor to define a sandbox environment defining a kernel space commands set of the processor to perform processing of the user data portion, isolating the processor within the sandbox environment in order to perform isolated execution of the request by the kernel space commands set, processing the user data portion within the sandbox environment, de-isolating the sandbox environment from the user space by returning an indication of a processed user data portion and writing the indication to the user space of the processor.

16 Claims, 6 Drawing Sheets

(56) References Cited

U.S. PATENT DOCUMENTS

| | | | |
|---|---|---|---|
| 9,070,211 B1 | 6/2015 | Kroeger et al. | |
| 2008/0127292 A1* | 5/2008 | Cooper | G06F 21/53 |
| | | | 726/1 |
| 2010/0274910 A1 | 10/2010 | Ghanaie-Sichanie | |
| 2011/0296487 A1 | 12/2011 | Walsh | |
| 2012/0017213 A1 | 1/2012 | Hunt et al. | |
| 2014/0053057 A1 | 2/2014 | Reshadi et al. | |

* cited by examiner

SYSTEM FOR AND METHOD OF DATA PROCESSING IN A COMPUTER-IMPLEMENTED SYSTEM

CROSS-REFERENCE

The present application claims priority to Russian Patent Application No. 2015141102, filed Sep. 28, 2015, entitled "SYSTEM FOR AND METHOD OF DATA PROCESSING IN A COMPUTER-IMPLEMENTED SYSTEM", the entirety of which is incorporated herein by reference.

TECHNICAL FIELD

The present technology relates to a system and a method for performing data processing. More specifically, the present technology relates to a system and a method for secure processing of a data portion in a sandbox environment.

BACKGROUND

Sandbox environments, also known as sandbox applications, are testing environments that isolate untested code changes, experimentation or potentially unstable processing requests from the rest of the productive environment of a computing system.

Sandboxing protects many aspects of a computational system that may be at risk from untested or unstable code, including hardware, active servers and their data and other collections of code, data and/or content. Untested or unstable code could induce damaging changes (inadvertent or intentional) to critical systems, or could simply cause changes that would be difficult to revert. In this case, a sandbox environment may be implemented as an application to run the potentially harmful code or processing request. Generally, sandboxes replicate at least the minimal functionality needed to accurately test the programs or processing requests.

System memory run by the processor is generally divided into two distinct "regions": kernel space and user space. The kernel space is where the core of the operating system runs and where the processor generally runs processes such as input/output device controllers (for running peripheral devices such as a monitor or a keyboard). User space is that set of memory locations in which user processes run, such as applications and executing programs. Communication between the user space and the kernel space is performed through system calls.

In order to run a sandbox environment on a computer-implemented system, a software application or similar set of commands must be created or downloaded from an external source. For each instance of the sandbox environment, the computer-implemented system also needs to initiate a new sandbox environment process. This will use system resources and power just to open the new sandbox environment, before any processing in the sandbox environment has occurred.

SUMMARY

It is an object of the present to ameliorate at least some of the inconveniences present in the prior art.

According to one aspect of the present technology, there is provided a computer-implemented system for processing a user device request to process a user data portion, the computer-implemented the system comprising a server having a processor, the processor having a user space and a kernel space, the processor configured to perform receiving the user device request to process the user data portion from a user device, upon receiving the user device request, reading the user data portion from a database at the server, allocating space at the processor to define a sandbox environment, the sandbox environment defining a kernel space commands set of the processor to perform processing of the user data portion, isolating the processor within the sandbox environment from the user space in order to perform isolated execution of the user device request by the kernel space commands set, processing the user data portion by the processor within the sandbox environment, de-isolating the sandbox environment from the user space by returning an indication of a processed user data portion and writing the indication of the processed user data portion to the user space of the processor.

In some implementations, isolating the processor comprises validating the user device request to process the user data portion, the user device request including an indication of the user data portion and at least one command to be executed to process the user data portion by the kernel space and adding executing the at least one command of the user device request to an execution line of the kernel space.

In some implementations, the indication of the processed user data portion is the processed user data portion.

In some implementations, the indication of the processed user data portion is a message to the user device that the user data portion was not processed correctly.

In some implementations, the processor is a first processor and a second processor, the user device request is a first user device request to process a first user data portion and a second user device request to process a second user data portion, the first processor is configured to perform the processing of the first user device request to process the first user data portion and the second processor is configured to perform the processing of the second user device request to process the second user data portion.

In some implementations, the first processor and the second processor are configured to be able to perform said processing contemporaneously.

In some implementations, said receiving the user device request for the user data portion processing from the user device comprises receiving the user device request for the user data portion processing from the user device via a compiling interface executed by the user device.

In some implementations, said receiving the user device request for the user data portion processing from the user device comprises receiving the user device request for the user data portion processing from the user device via a command line interface, the command line interface executed by the client device.

In some implementations, the user device request for the user data portion processing is composed of commands chosen from the kernel space commands set.

In some implementations, the user device request for the user data portion processing comprises at least one non-standard command, the at least one non-standard command not being a member of the kernel space commands set, and wherein the processor is further configured to perform, upon receiving the user device request for the user data portion processing from the user device, determining that the user device request comprises the at least one non-standard command, transmitting the request to a temporal processor space, modifying, in the temporal processor space, the user device request for the user data portion processing, said modifying including translating the at least one non-standard command into at least one kernel space command from the kernel space commands set, transmitting the modified user device request to the kernel space of the processor and resuming with said reading the user data portion from the database at the server.

According to another aspect of the present technology, there is provided a computer-implemented method for processing a user device request to process a user data portion, the computer-implemented method being executable at a computer-implemented system comprising a server having a processor, the processor having a user space and a kernel space, the processor configured to perform the method, the method comprising receiving the user device request to process the user data portion from a user device; upon receiving the user device request, reading the user data portion from a database at the server; allocating space at the processor to define a sandbox environment, the sandbox environment defining a kernel space commands set of the processor to perform processing of the user data portion; isolating the processor within the sandbox environment from the user space in order to perform isolated execution of the user device request by the kernel space commands set; processing the user data portion within the sandbox environment; de-isolating the sandbox environment from the user space by returning an indication of a processed user data portion and writing the indication of the processed user data portion to the user space of the processor.

In some implementations, isolating the processor comprises validating the user device request to process the user data portion, the user device request including an indication of the user data portion and at least one command to be executed to process the user data portion by the kernel space and adding executing the at least one command of the user device request to an execution line of the kernel space.

In some implementations, the indication of the processed user data portion is the processed user data portion.

In some implementations, the indication of the processed user data portion is a message to the user that the user data portion was not processed correctly.

In some implementations, the processor is a first processor and a second processor, the user device request is a first user device request to process a first user data portion and a second user device request to process a second user data portion and wherein the first processor is configured to perform the processing of the first user device request to process the first user data portion and the second processor is configured to perform the processing of the second user device request to process the second user data portion.

In some implementations, the first processor and the second processor are configured to be able to perform the computer-implemented method contemporaneously.

In some implementations, said receiving the user device request for the user data portion processing from the user device comprises receiving the user device request for the user data portion processing from the user device via a compiling interface executed by the user device.

In some implementations, said receiving the user device request for the user data portion processing from the user device comprises receiving the user device request for the user data portion processing from the user device via a command line interface executed by the user device.

In some implementations, the user device request is composed of commands chosen from the kernel space commands set.

In some implementations, the user device request comprises at least one non-standard command, the at least one non-standard command not being a member of the kernel space commands set, and wherein the computer-implemented method further comprises upon receiving the user device request for the user data portion processing from the user device, determining that the user device request comprises the at least one non-standard command, transmitting the request to a temporal processor space, modifying, in the temporal processor space, the user device request for the user data portion processing, said modifying including translating the at least one non-standard command into at least one kernel space command of the kernel space command set, transmitting the modified user device request to the kernel space of the processor and resuming with said reading the user data portion from the database at the server.

In the context of the present specification, unless provided expressly otherwise, a "server" is a computer program that is running on appropriate hardware and is capable of receiving requests (e.g. from user devices) over a network, and carrying out those requests, or causing those requests to be carried out. The hardware may be one physical computer or one physical computer system, but neither is required to be the case with respect to the present technology. In the present context, the use of the expression a "server" is not intended to mean that every task (e.g. received instructions or requests) or any particular task will have been received, carried out, or caused to be carried out, by the same server (i.e. the same software and/or hardware); it is intended to mean that any number of software elements or hardware devices may be involved in receiving/sending, carrying out or causing to be carried out any task or request, or the consequences of any task or request; and all of this software and hardware may be one server or multiple servers.

In the context of the present specification, unless provided expressly otherwise, a "processor" or a "graphics processing unit", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. In some embodiments of the present technology, the processor may be a general purpose processor, such as a central processing unit (CPU) or a processor dedicated to a specific purpose, such as a graphics processing unit (GPU). Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included.

It should be understood that phrases such as "user space" and "kernel space" do not necessarily refer to physical locations. The spaces generally refer instead to virtual spaces, including memory assigned to certain computational tasks, within a computer-implemented system.

In the context of the present specification, unless provided expressly otherwise, "user device" is any computer hardware that is capable of running software appropriate to the relevant task at hand. Thus, some (non-limiting) examples of electronic devices include personal computers (desktops, laptops, netbooks, etc.), smartphones, and tablets, as well as network equipment such as routers, switches, and gateways. It should be noted that a device acting as a user device in the present context is not precluded from acting as a server to other user devices. The use of the expression "a user device" does not preclude multiple user devices being used in receiving/sending, carrying out or causing to be carried out any task or request, or the consequences of any task or request, or steps of any method described herein.

In the context of the present specification, unless expressly provided otherwise, an "indication" of a data element may be the data element itself or a pointer, reference, link, or other indirect mechanism enabling the recipient of the indication to locate a network, memory, database, or other computer-readable medium location from which the data element may be retrieved. For example, an indication of a document could include the document itself (i.e. its contents), or it could be a unique document descriptor identifying a file with respect to a particular file system, or some other means of directing the recipient of the indication to a network location, memory address, database table, or other location where the file may be accessed.

In the context of the present specification, unless provided expressly otherwise, a "database" is any structured collection of data, irrespective of its particular structure, the dataset management software, or the computer hardware on which the data is stored, implemented or otherwise rendered available for use. A database may reside on the same hardware as the process that stores or makes use of the information stored in the user data portion or it may reside on separate hardware, such as a dedicated server or plurality of servers.

In the context of the present specification, unless provided expressly otherwise, the expression "data", especially in reference to the user data portion, includes information or data of any nature or kind whatsoever capable of being stored in a database. Thus information includes, but is not limited to audiovisual works (images, movies, sound records, presentations etc.), data (location data, numerical data, etc.), text (opinions, comments, questions, messages, etc.), documents, spreadsheets, etc.

In the context of the present specification, unless provided expressly otherwise, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "first server" and "third server" is not intended to imply any particular order, type, chronology, hierarchy or ranking (for example) of/between the server, nor is their use (by itself) intended imply that any "second server" must necessarily exist in any given situation. Further, as is discussed herein in other contexts, reference to a "first" element and a "second" element does not preclude the two elements from being the same actual real-world element. Thus, for example, in some instances, a "first" processor and a "second" processor may be the same software and/or hardware, in other cases they may be different software and/or hardware.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects, and advantages of implementations of the present technology will become apparent from the following description, the accompanying drawings, and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

The present detailed description is intended to be only a description of illustrative examples of the present technology. This description is not intended to define the scope nor set forth the bounds of the present technology. In some cases, helpful examples of modifications may be set forth as an aid to understanding the present technology, and not to define the scope or set forth the bounds of the present technology. These modifications are not an exhaustive list and other modifications are likely possible. Further, where this has not been done (i.e. where no examples of modifications have been set forth), it should not be interpreted that no modifications are possible and/or that what is described is the sole manner of implementing that particular aspect of the present technology. As a person skilled in the art would understand, this is likely not the case. In addition it is to be understood that the present detailed description provides in certain instances simple implementations of the present technology, and that where such is the case they have been presented in this manner as an aid to understanding. Various implementations of the present technology may be of a greater complexity.

Figure 1:
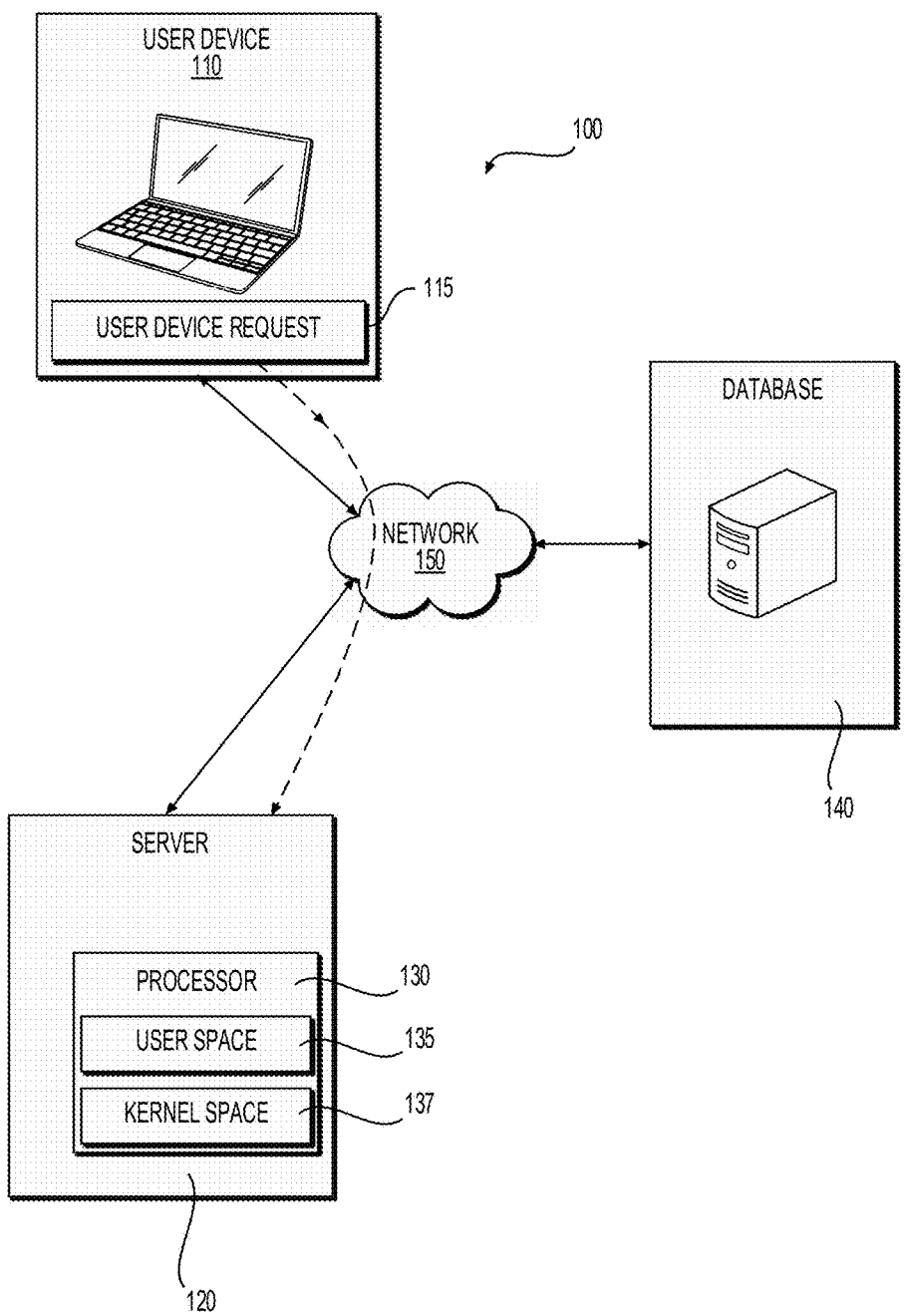
FIG. 1 is a schematic diagram of a non-limiting implementation of a computer-implemented system in accordance with the present technology.

Referring to FIG. 1, a simplified schematic representation of a computer-implemented system 100 in accordance with the present technology is presented. The system 100 includes a network 150 to enable different system components to communicate. In some non-limiting implementations, the network 150 can be implemented as an Internet communications network 150. In other implementations of the present technology, the network 150 can be implemented differently, including such as a wide-area communication network 150, a local-area communication network 150 and the like.

Also included in the system 100 is a user device 110, the user device 110 being a device utilized by a user of the system 100. Also included in the system 100 is a server 120 connected via the network 150, the server 120 having a processor 130. The system 100 also includes a database 140 connected to other parts of the system 100 by the network 150.

Various types of user devices 110 may be used in the context of the present technology. For example, the user device 110 may be a smart phone, a tablet, a laptop, a computer, a television, a game console, or any other type of user device 110 which is adapted for, and capable of, accessing the network 150. The user device 110 may access the network 150 directly, or through an extranet server, a Wi-Fi access point, an Internet service provide, a cellular service provider, etc.

For simplicity purposes, and for the sake of the present description, the system 100 is depicted with only three categories of node, namely the user device 110, the server 120 and the database 140 connecting through the network 150. However, those skilled in the art will recognize that the system 100 could include many more categories of node, and in each category of node, multiple types of equipment could be used. Each category of node may communicate with the other categories of node, in accordance with established protocols and standards. Additionally, the number of each node may be different in different implementations, where a user may use one or more user devices 110 to send a user device request 115 for user data processing via the network 150 to the processor 130, for example.

Figure 2:
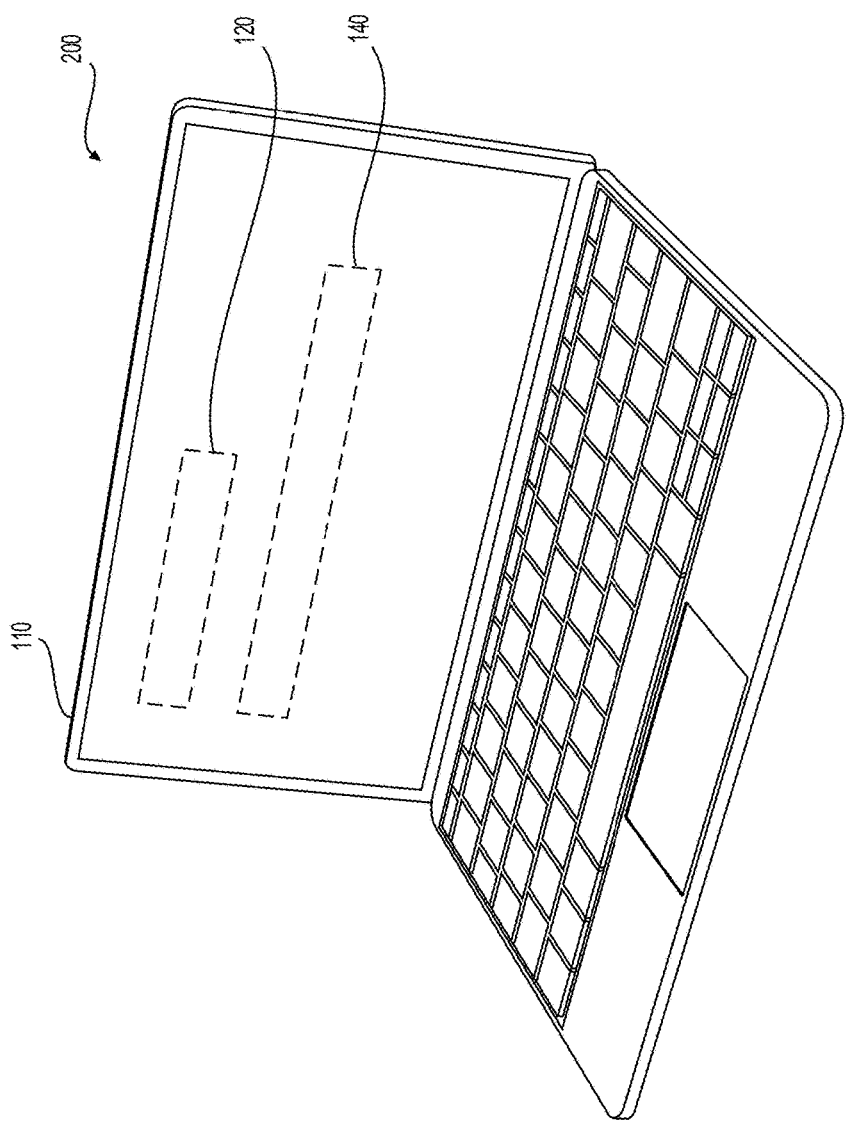
FIG. 2 is a schematic diagram of another non-limiting implementation of a computer-implemented system in accordance with the present technology.

As illustrated in FIG. 2, a computer-implemented system 200 may be one integrated computer system, where the different components are integral to the system 200. Examples of non-limiting implementations of the system 200 include, but are not limited to: a laptop computer, a desktop computer, a server and a computing cluster. In this case, the user device 110 generally contains all the components of the system 200, including the server 120 and the database 140. The network 150 (not shown) is simply the internal communication connections between the different components. In some non-limiting implementations, the user device 110 is an access terminal device 110 in a large closed computing network system 200. In other implementations, the user device 110 could be the server 120 sending processing requests, as will be described later, to the processor 130.

In some non-limiting implementations, the computer-implemented system can be a combination of the systems 100 and 200 illustrated in FIGS. 1 and 2 respectively. For example in some implementations, the server 120 and the user device 110 could be connected to an internal network (not shown) within a closed system, while connecting to a database 140 via an Internet communications network 150.

In all the computer-implemented systems described above, the processor 130 of the server 120 has a user space 135 and a kernel space 137, both of which will be described in more detail below. The processor 130 may be any processor capable of carrying out the method of the present technology. It is contemplated that this could include, but is not limited to: a single dedicated processor 130, a single shared processor 130, graphics processing unit (GPU) 130 and a central processing unit (CPU). It is also contemplated that the method be carried out multiple times in parallel on a plurality of individual processors 130 or on a multi-core processor 130, as will be discussed below.

Figure 3:
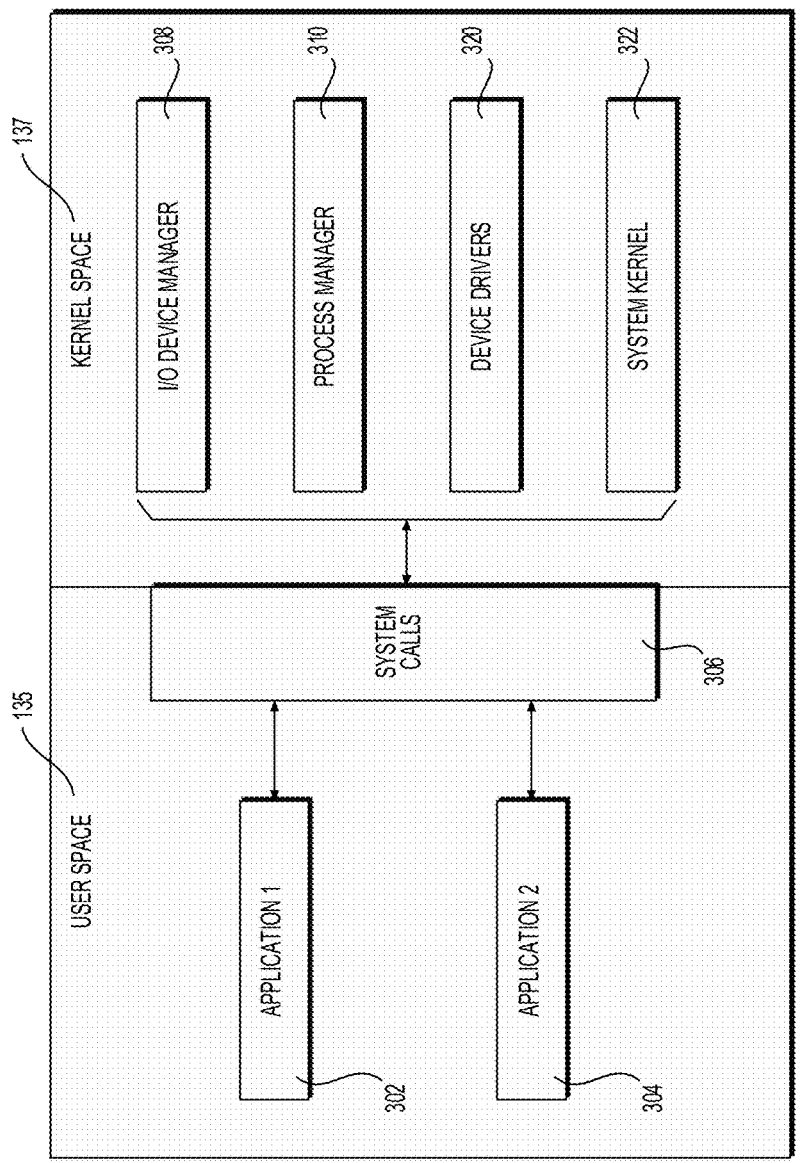
FIG. 3 is a schematic diagram of processor space in accordance with the present technology.

According to the present technology, the processor 130 and its corresponding memory is partitioned into user space 135 and kernel space 137, as illustrated by FIG. 3. In normal operation, the user space 135 governs execution of software applications such as a first application 302 or a second application 304. User space 135 also generally contains any process that may not be stable or trusted enough to have access to system hardware or the operating system. The applications 302 and 304 access system drivers and memory through system calls, which pass user space requests to the kernel processes.

Kernel space 137 is tasked with running an operating system kernel 322, device drivers 320, a process manager 310 and an input/output (I/O) device manager 308. The operating system kernel 322 is a computer program that manages input and output requests from software in the user space, such as the applications 302 and 304, and translates them into data processing instructions for the processor 130. The process manager 310 allocates resources to processes and protects processes from interfering with each other. Device drivers 320 and the I/O device manager 308 operate, control or manage devices, such as a computer monitor and the computer keyboard, that are connected to the server 120 of the system 100. For system security, kernel space 137 operates using a set of kernel space commands which are known, stable commands that will not generally endanger the normal operations of the computer-implemented system 100.

It should be expressly understood that implementations for the user device 110, the network 150, the server 120 and the database 140 are provided for illustration purposes only. As such, those skilled in the art will easily appreciate other specific implementation details for the user device 110, the network 150, the server 120, the database 140 and the processor 130. As such, examples provided herein above are by no means meant to limit the scope of the present technology.

Figure 4:
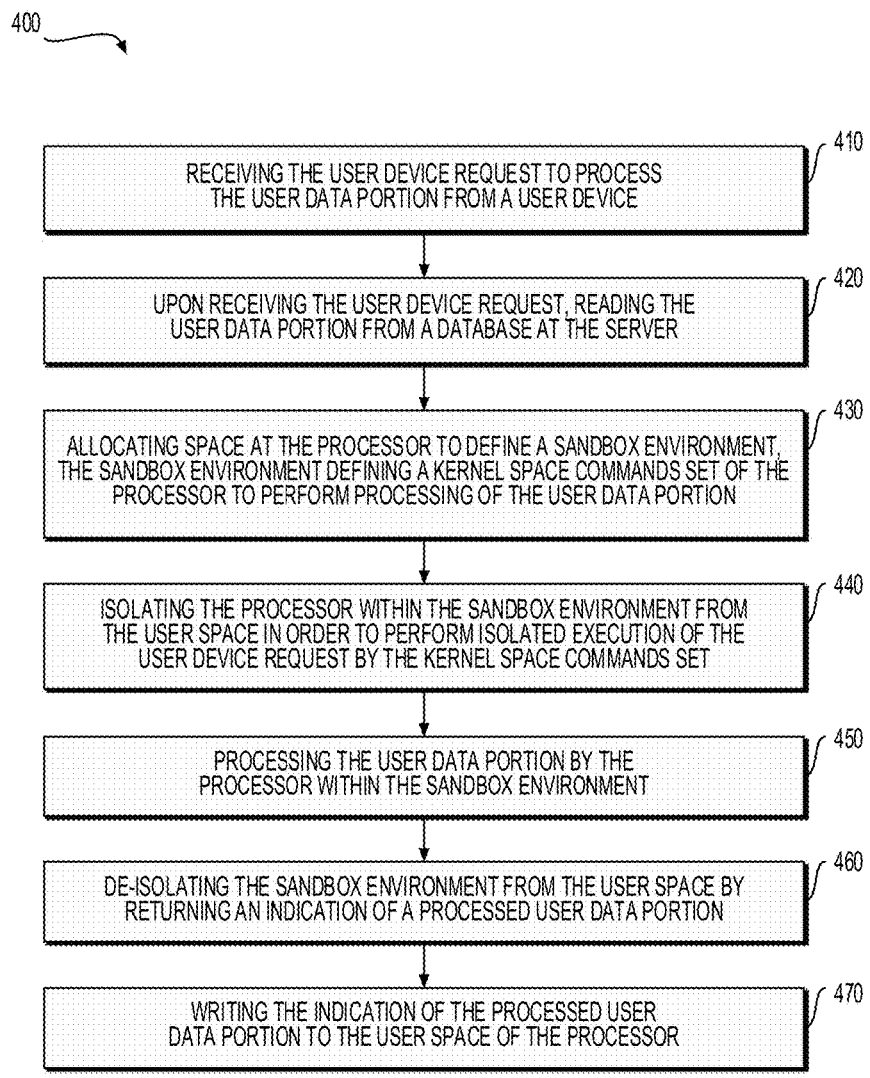
FIG. 4 is a flowchart illustrating a non-limiting implementation of a computer-implemented method in accordance with the present technology.
Figure 5:
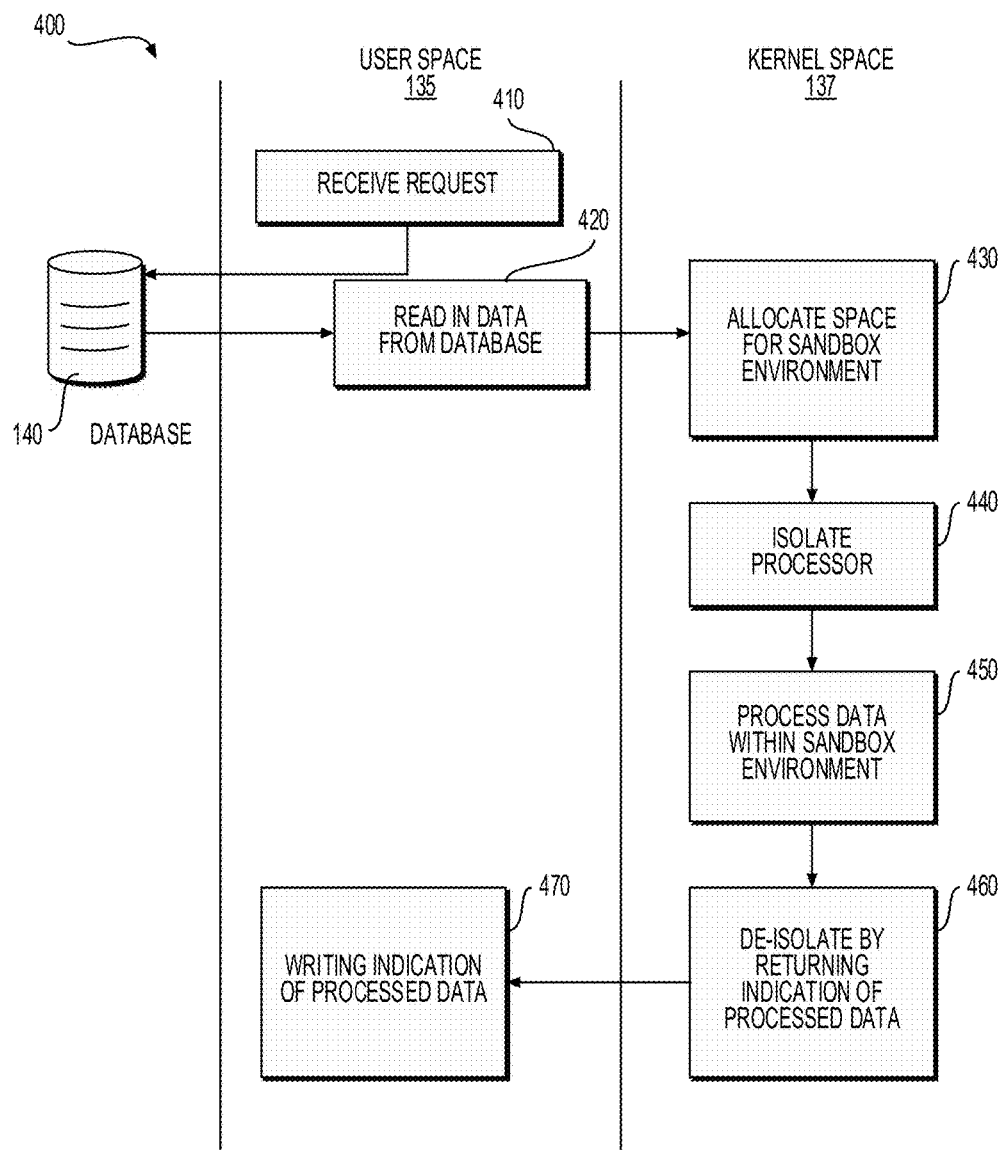
FIG. 5 is a flowchart illustrating the non-limiting implementation of a computer-implemented method of FIG. 4, illustrating the processor space utilization of the computer-implemented method.

An implementation of a method 400 in accordance with the present technology is illustrated in FIGS. 4 and 5. A linear flowchart of the steps included in the method 400 of at least one implementation in accordance with the present technology is illustrated in FIG. 4. A flowchart illustrating the method 400 with the method steps shown in their corresponding processor spaces is displayed in FIG. 5.

The computer-implemented method 400 for processing a user device request 115 to process a user data portion is displayed schematically and is executable at a computer-implemented system such as the system 100 illustrated in FIG. 1 or system 200 illustrated in FIG. 2. The method 400 below will be discussed with respect to FIG. 1 only for simplicity, but can be performed equally by the system 200 in FIG. 2.

As displayed in FIG. 1, the system 100 includes the server 120 having the processor 130, the processor 130 having the user space 135 and the kernel space 137 configured to be able to perform the method 400.

Method 400 begins by receiving 410 the user device request 115 to process the user data portion from the user device 110 via the network 150, as illustrated in FIG. 1. It is contemplated that the user device request 115 may be sent from the user device 110 as part of a larger process, such that the user device 110 makes the request without user initiation. It is also contemplated that the user device request 115 could be directly initiated by a user using the user device 110, such as initiating the user device request 115 at a terminal or via a personal computer. It is contemplated that the user could construct the user device request 115 in multiple ways. In some non-limiting implementations, the user could construct and submit the user device request 115 using a command line interface at the user device 110. In some other non-limiting implementations, the user could construct and submit the user device request 115 using a compiling interface, including but not limited to a graphical user interface, at the user device 110.

The user device request 115 is the command originating from the user device 110 for a user data portion to be processed. The user device request 115 includes the user data portion or an indication of the user data portion. The indication of the user data portion may be a link or pointer to the user data portion stored in a database 140 or similar. It is contemplated that the user device request 115 could also include, but is not limited to, directions on how processing of the user data portion is to be executed, functions and/or commands to be used in the processing. The user device request 115 may be a code portion composed of one of any number of programming languages which are capable of working with the kernel space 137 or include system call language in their command sets. These include, but are not limited to, C++, Python, GO, php, Lua and Java.

In some implementations, the user device request 115 for the user data portion processing includes coding which uses commands chosen from the kernel space commands set. In this case the user device request 115 is in a form that can be processed in kernel space 137 directly, as the code used by the user device request 115 uses only commands already known to the kernel space 137.

In some implementations, the user device request 115 for the user data portion processing is composed of commands including at least one non-standard command By including a non-standard command, specifically a command that does not belong to the kernel space command set, further steps are need in the method after the receiving 410.

In this case, the processor 130 is further configured to determine that the user device request 115 contains one or more one non-standard command. The processor 130 then transmits the request to a temporal processor space. In the temporal processor space, the user device request 115 can be prepared to be processed by in the kernel space 137. Once in the temporal processor space, the method 400 continues by modifying the user device request 115. The user device request 115 is modified by at least translating the one or more non-standard commands into kernel space commands chosen from the kernel space commands set. Each non-standard command may translate into a single kernel space command, into multiple kernel space commands, or one kernel space 137 command may be able to take the place of multiple non-standard commands Finally the modified user device request 115 is transmitted to the kernel space 137 of the processor 130 in order to continue with the method 400, now that the user device request 115 is in a form, specifically composed of kernel space commands, which the kernel space 137 can readily process. Next, the method 400 continues upon receiving the user device request 115 by reading 420 the user data portion from a database 140 at the server 120. In some implementations, the user device request 115 will comprise an indication of the user data portion stored at the database 140.

The method 400 continues by allocating 430 space at the processor 130 to define a sandbox environment. The sandbox environment is defined by the space, or memory, reserved in the kernel space 137, as well as a set of kernel space commands to perform processing of the user data portion. By allocating space to perform processing with the kernel space commands set and isolating the kernel space 137 as will be described below, the method 400 provides a space to securely perform the requested processing. As the kernel space 137 is built by the system 100 to be a stable operating environment and will only perform commands from the kernel space command set, this creates a stable, isolated operating environment in which to provide secure processing. For these reasons, the method 400 uses the kernel space 137 to provide a sandbox environment. It should be noted, however, that this sandbox environment does not depend on an application to be executed in order to provide secure processing. No new application or process is initiated to create the sandbox environment, beyond the user device request 115.

Then, the method 400 isolates 440 the processor 130 within the sandbox environment from the user space 135 in order to perform isolated execution of the user device request 115 by the kernel space commands set. For example, the method 400 isolates kernel drivers of the operating system from the user space 135. Kernel drivers are responsible for driving execution (operating) of the operating system. General drivers, such as the device drivers 320, and the operating system itself by default are not isolated from non-kernel (general) drivers and the operating system itself. For example, if a kernel based driver accidentally writes to the wrong addresses, data that belongs to the operating system or another driver could be compromised. If one of the kernel drivers crashes, the entire system 100 is negatively affected. The isolated kernel drivers are thus not receiving commands from out of the isolated kernel space 137. The kernel space command set is made up of stable standard computing commands available to the kernel space 137 and includes, but is not limited to, the following: socket, accept, bind, select, close, listen, read, send, batch and batch_exec.

The processor 130 portion performing the method 400 thus can perform the secure processing by utilizing only the kernel space commands set. As the kernel space commands are known functions that operate securely within the kernel space 137, the user data portion is processed securely and stably.

According to some non-limiting implementations of the present technology, isolating 440 the processor 130 within the sandbox environment can take the form of first validating the user device request 115 to process the user data portion. Validating the user device request 115 ensures that the commands in the user device request 115 either are chosen from the kernel space command set, or that the user device request 115 will be modified as described above. Next, having validated that the commands of the user device request 115 are compatible with operation in the kernel space 137, the processing is added to an execution line of the kernel space 137.

The validating step may also include receiving a request command set of the user device request 115. The request command set is then checked to a list of validated (permitted) commands to be transferred into the kernel space 137. The user device request 115 may also be validated via an application acquiring the user device request code by a dedicated code. The dedicated code is responsible for checking the user device request code for vulnerabilities (whether the user device request code itself is potentially unstable or damaging) and for the presence of malware code or other "bad code" that may ruin the kernel space 137 or the processor 130 operation.

Next, the method 400 continues by processing 450 the user data portion within the sandbox environment. The processing 450 in the sandbox environment is carried out by the processor 130 using the commands included in the user device request 115 and/or their associated commands from the kernel space command set.

The next step of method 400 is to de-isolate 460 the sandbox environment from the user space 135 by returning an indication of a processed user data portion. The method 400 thus de-isolates the kernel drivers of the operating system from the user space 135, removing the isolation described above and returning the kernel drivers to their normal operational state. The processed user data portion is the end result of the sandbox processing of the user data portion. The indication of the processed user data portion can include, but is not limited to: the processed user data portion directly, a pointer or link to the processed user data portion having been saved to a database or similar storage, a message that there was an error in the processing, a message that the user data portion was not able to be processed.

Finally, the method 400 ends by writing 470 the indication of the processed user data portion to the user space 135 of the processor 130. Depending on the system 100 implementing the method 400 and the style of the indication of the processed user data portion, as discussed above, the output of the method may be of different forms.

Figure 6:
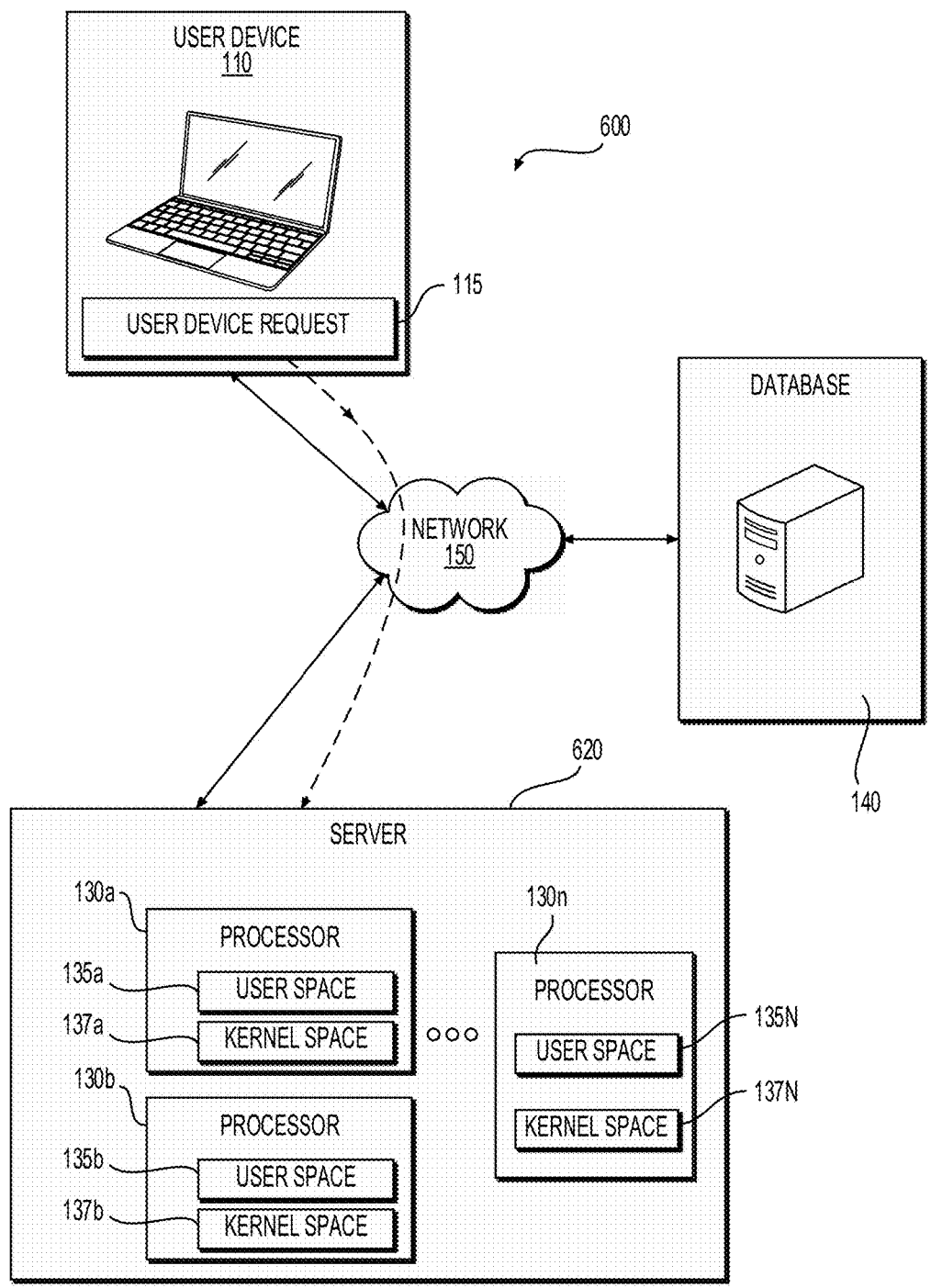
FIG. 6 is a schematic diagram of another non-limiting implementation of a computer-implemented system in accordance with the present technology.

In another non-limiting implementation of a system 600 in accordance with the present technology, multiple processors 130 can be used to provide multiple simultaneous sandbox environments without the additional load of running multiple sandbox environment applications, as is illustrated in FIG. 6. The system 600 again includes a network 150 connecting the nodes of the system 600 together. In this implementation, the server 620 includes multiple processors 130a-N. Each processor 130a-N has a user space 135a-N and a kernel space 137a-N, as with the processor 130 described above. The multiple processors 130N could be implemented by a dual core processor (N=2), a multi-core processor 130, or simply a group of N processors 130.

Using system 600, each kernel space 137N of the processors 130N is available to serve as a separate sandbox environment. Several user device requests 115 could be received and implemented contemporaneously or simultaneously. For example, in another non-limiting implementation, the method 400 can provide secure sandbox processing for two user device requests 115. Instead of one processor 130, the method 400 uses a first processor 130a and a second processor 130b, as illustrated in FIG. 6, where system 600 has N-processors including two processors called processor 130a and processor 130b.

In this implementation, method 400 begins by receiving 410 a first user device request 115 to process a first user data portion from the user device 110 and a second user device request 115 to process a second user data portion from the user device 110. Next, the method 400 continues as described above by reading 420 the first user data portion and the second user data portion from the database 140.

The method 400 continues by allocating 430 space at the first and second processors 130a and 130b to define a first sandbox environment and a second sandbox environment. The method 400 then continues as explained above for each of the processors 130a, b. By providing two sandbox environments concurrently using the present technology, two user data portions may be securely processed (1) simultaneously and (2) without the additional computational burden of installing and running an additional sandbox environment software application for each new instance of the user device request 115 to process the user data portion.

When the isolating, processing and de-isolating are complete, the method 400 ends by writing 470 a first indication of the processed user data portion corresponding to the first user device request 115 to the user space 135a of the processor 130a and a second indication of the processed user data portion corresponding to the second user device request 115 to the user space 135b of the processor 130b.

It is contemplated that in some non-limiting implementations of the method 400, the processing in the first and second sandbox environments is performed on the first and second processors 130a, b contemporaneously. It is also contemplated that in some other non-limiting implementations of the method 400, the processing in the first and second sandbox environments is performed on the first and second processors 130a, b overlapping in time, but not necessarily beginning or ending the method 400 in each processor simultaneously.

It is further contemplated that the first user device request 115 and the second user device request 115 could be received from different user devices 110. It is also contemplated that the user data portions could be stored at different databases 140.

While the above-described implementations have been described and shown with reference to particular steps performed in a particular order, it will be understood that these steps may be combined, sub-divided, or re-ordered without departing from the teachings of the present technology. Accordingly, the order and grouping of the steps is not a limitation of the present technology.

It should be expressly understood that not all technical effects mentioned herein need to be enjoyed in each and every embodiment of the present technology. For example, embodiments of the present technology may be implemented without the user enjoying some of these technical effects, while other embodiments may be implemented with the user enjoying other technical effects or none at all.

Some of these steps and signal sending-receiving are well known in the art and, as such, have been omitted in certain portions of this description for the sake of simplicity.

The signals can be sent-received using optical means (such as a fibre-optic connection), electronic means (such as using wired or wireless connection), and mechanical means (such as pressure-based, temperature based or any other suitable physical parameter based).

As such, the methods and systems implemented in accordance with some non-limiting embodiments of the present technology can be represented as follows, presented in numbered clauses.

Clause 1.

A computer-implemented system (100) for processing a user device request (115) to process a user data portion, the computer-implemented system (100) comprising: a server (120, 620) having a processor (130, 130a, 130b), the processor (130, 130a, 130b) having a user space (135) and a kernel space (137), the processor (130, 130a, 130b) configured to perform:
(a) receiving the user device request (115) to process the user data portion from a user device (110),
(b) upon receiving the user device request (115), reading the user data portion from a database (140) at the server (120, 620),
(c) allocating space at the processor (130, 130a, 130b) to define a sandbox environment, the sandbox environment defining a kernel space commands set of the processor (130, 130a, 130b) to perform processing of the user data portion,
(d) isolating the processor (130, 130a, 130b) within the sandbox environment from the user space (135) in order to perform isolated execution of the user device request (115) by the kernel space commands set,
(e) processing the user data portion by the processor (130, 130a, 130b) within the sandbox environment,
(f) de-isolating the sandbox environment from the user space (135) by returning an indication of a processed user data portion, and
(g) writing the indication of the processed user data portion to the user space (135) of the processor (130, 130a, 130b).

Clause 2.

The computer-implemented system of clause 1, wherein isolating the processor (130, 130a, 130b) comprises:

(a) validating the user device request (115) to process the user data portion, the user device request (115) including an indication of the user data portion and at least one command to be executed to process the user data portion by the kernel space (137); and (b) adding executing the at least one command of the user device request (115) to an execution line of the kernel space (137).

Clause 3.

The computer-implemented system of any one of clauses 1 and 2, wherein the indication of the processed user data portion is the processed user data portion.

Clause 4.

The computer-implemented system of any one of clauses 1 and 2, wherein the indication of the processed user data portion is a message to the user device (110) that the user data portion was not processed correctly.

Clause 5.

The computer-implemented system of any one of clauses 1 to 4, wherein:

(a) the processor (130, 130a, 130b) is a first processor (130, 130a, 130b) and a second processor (130, 130a, 130b);

(b) the user device request (115) is a first user device request (115) to process a first user data portion and a second user device request (115) to process a second user data portion;

(c) the first processor (130, 130a, 130b) is configured to perform the processing of the first user device request (115) to process the first user data portion; and (d) the second processor (130, 130a, 130b) is configured to perform the processing of the second user device request (115) to process the second user data portion.

Clause 6.

The computer-implemented system of clause 5, wherein the first processor (130, 130a, 130b) and the second processor (130, 130a, 130b) are configured to be able to perform said processing contemporaneously.

Clause 7.

The computer-implemented system of any one of clauses 1 to 6, wherein said receiving the user device request (115) for the user data portion processing from the user device (110) comprises receiving the user device request (115) for the user data portion processing from the user device (110) via a compiling interface executed by the user device (110).

Clause 8.

The computer-implemented system of any one of clauses 1 to 6, wherein said receiving the user device request (115) for the user data portion processing from the user device (110) comprises receiving the user device request (115) for the user data portion processing from the user device (110) via a command line interface, the command line interface executed by the client device.

Clause 9.

The computer-implemented system of any one of clauses 1 to 6, wherein the user device request (115) for the user data portion processing is composed of commands chosen from the kernel space commands set.

Clause 10.

The computer-implemented system of any one of clauses 1 to 6, wherein the user device request (115) for the user data portion processing comprises at least one non-standard command, the at least one non-standard command not being a member of the kernel space commands set, and wherein the processor (130, 130a, 130b) is further configured to perform:

(a) upon receiving the user device request (115) for the user data portion processing from the user device (110), determining that the user device request (115) comprises the at least one non-standard command;

(b) transmitting the request to a temporal processor space;

(c) modifying, in the temporal processor space, the user device request (115) for the user data portion processing, said modifying including translating the at least one non-standard command into at least one kernel space command from the kernel space commands set;

(d) transmitting the modified user device request (115) to the kernel space (137) of the processor (130, 130a, 130b); and (e) resuming with said reading the user data portion from the database (140) at the server (120, 620).

Clause 11.

A method (400) for processing a user device request (115) to process a user data portion, the computer-implemented method being executable at a computer-implemented system comprising a server (120, 620) having a processor (130, 130a, 130b), the processor (130, 130a, 130b) having a user space (135) and a kernel space (137), the processor (130, 130a, 130b) configured to perform the method, the method comprising:

(a) receiving (410) the user device request (115) to process the user data portion from a user device (110);

(b) upon receiving the user device request (115), reading (420) the user data portion from a database (140) at the server (120, 620);

(c) allocating (430) space at the processor (130, 130a, 130b) to define a sandbox environment, the sandbox environment defining a kernel space commands set of the processor (130, 130a, 130b) to perform processing of the user data portion;

(d) isolating (440) the processor (130, 130a, 130b) within the sandbox environment from the user space (135) in order to perform isolated execution of the user device request (115) by the kernel space commands set;

(e) processing (450) the user data portion within the sandbox environment;

(f) de-isolating (460) the sandbox environment from the user space (135) by returning an indication of a processed user data portion; and (g) writing (470) the indication of the processed user data portion to the user space (135) of the processor (130, 130a, 130b).

Clause 12.

The computer-implemented method of clause 11, wherein isolating (440) the processor (130, 130a, 130b) comprises:

(a) validating the user device request (115) to process the user data portion, the user device request (115) including an indication of the user data portion and at least one command to be executed to process the user data portion by the kernel space (137); and (b) adding executing the at least one command of the user device request (115) to an execution line of the kernel space (137).

Clause 13.

The computer-implemented method of any one of clauses 11 and 12, wherein the indication of the processed user data portion is the processed user data portion.

Clause 14.

The computer-implemented method of any one of clauses 11 and 12, wherein the indication of the processed user data portion is a message to the user that the user data portion was not processed correctly.

Clause 15.

The computer-implemented method of any one of clauses 11 to 14, wherein:
- (a) the processor (130, 130a, 130b) is a first processor (130, 130a, 130b) and a second processor (130, 130a, 130b);
- (b) the user device request (115) is a first user device request (115) to process a first user data portion and a second user device request (115) to process a second user data portion; and wherein:
- (c) the first processor (130, 130a, 130b) is configured to perform the processing of the first user device request (115) to process the first user data portion, and
- (d) the second processor (130, 130a, 130b) is configured to perform the processing of the second user device request (115) to process the second user data portion.

Clause 16.

The computer-implemented method of clause 15, wherein the first processor (130, 130a, 130b) and the second processor (130, 130a, 130b) are configured to be able to perform the computer-implemented method contemporaneously.

Clause 17.

The computer-implemented method of any one of clauses 11 to 16, wherein said receiving the user device request (115) for the user data portion processing from the user device (110) comprises receiving the user device request (115) for the user data portion processing from the user device (110) via a compiling interface executed by the user device (110).

Clause 18.

The computer-implemented method of any one of clauses 11 to 16, wherein said receiving the user device request (115) for the user data portion processing from the user device (110) comprises receiving the user device request (115) for the user data portion processing from the user device (110) via a command line interface executed by the user device (110).

Clause 19.

The computer-implemented method of any one of clauses 11 to 18, wherein the user device request (115) is composed of commands chosen from the kernel space commands set.

Clause 20.

The computer-implemented method of any one of clauses 11 to 18, wherein the user device request (115) comprises at least one non-standard command, the at least one non-standard command not being a member of the kernel space commands set, and wherein the computer-implemented method further comprises:
- (a) upon receiving the user device request (115) for the user data portion processing from the user device (110), determining that the user device request (115) comprises the at least one non-standard command;
- (b) transmitting the request to a temporal processor space;
- (c) modifying, in the temporal processor space, the user device request (115) for the user data portion processing, said modifying including translating the at least one non-standard command into at least one kernel space command of the kernel space command set;
- (d) transmitting the modified user device request (115) to the kernel space (137) of the processor (130, 130a, 130b); and (e) resuming with said reading the user data portion from the database (140) at the server (120, 620).

The present technology provides several advantages over the known art in the domain. By providing a method of and system for data processing in a computer-implemented system through the sandbox environment in the kernel space, secure data processing can be accomplished with reduced computational time and energy burdens. By providing a method for providing sandbox environments without the need for additional software applications, processor time and energy consumption is reduced. By providing two or more sandbox environments concurrently using the present technology, multiple user data portions may be securely processed (1) simultaneously and (2) without the additional computational burden of installing and running an additional sandbox environment software application for each new instance of the user device request (115) to process the user data portion.

Modifications and improvements to the above-described embodiments of the present technology may become apparent to those skilled in the art. The foregoing description is intended to be exemplary rather than limiting. The scope of the present technology is therefore intended to be limited solely by the scope of the appended claims.

What is claimed is:

1. A computer-implemented system for processing a user device request to process a user data portion, the computer-implemented system comprising:
   a server having a processor, the processor having a user space and a kernel space, the processor configured to perform:
   receiving the user device request to process the user data portion from a user device,
   upon receiving the user device request, reading the user data portion from a database at the server,
   allocating space at the processor to define a sandbox environment, the sandbox environment defining a kernel space commands set of the processor to perform processing of the user data portion,
   isolating the processor within the sandbox environment from the user space in order to perform isolated execution of the user device request by the kernel space commands set,
   processing the user data portion by the processor within the sandbox environment,
   de-isolating the sandbox environment from the user space by returning an indication of a processed user data portion, and
   writing the indication of the processed user data portion to the user space of the processor; and
   the processor being further configured to perform:
   upon receiving the user device request for the user data portion processing from the user device, determining that the user device request comprises the at least one non-standard command,
   transmitting the user device request to a temporal processor space,
   modifying, in the temporal processor space, the user device request for the user data portion processing, said modifying including translating the at least one non-standard command into at least one kernel space command from the kernel space commands set,
   transmitting the modified user device request to the kernel space of the processor, and
   resuming with said reading the user data portion from the database at the server.

2. The computer-implemented system of claim 1, wherein isolating the processor comprises:
   validating the user device request to process the user data portion, the user device request including an indication of the user data portion and at least one command to be executed to process the user data portion by the kernel space; and adding executing the at least one command of the user device request to an execution line of the kernel space.

3. The computer-implemented system of claim 1, wherein the indication of the processed user data portion is the processed user data portion.

4. The computer-implemented system of claim 1, wherein the indication of the processed user data portion is a message to the user device that the user data portion was not processed correctly.

5. The computer-implemented system of claim 1, wherein:
the processor is a first processor and a second processor;
the user device request is a first user device request to process a first user data portion and a second user device request to process a second user data portion;
the first processor is configured to perform the processing of the first user device request to process the first user data portion; and
the second processor is configured to perform the processing of the second user device request to process the second user data portion.

6. The computer-implemented system of claim 5, wherein the first processor and the second processor are configured to be able to perform said processing contemporaneously.

7. The computer-implemented system of claim 1, wherein said receiving the user device request for the user data portion processing from the user device comprises receiving the user device request for the user data portion processing from the user device via a compiling interface executed by the user device.

8. The computer-implemented system of claim 1, wherein said receiving the user device request for the user data portion processing from the user device comprises receiving the user device request for the user data portion processing from the user device via a command line interface, the command line interface executed by the client device.

9. A computer-implemented method for processing a user device request to process a user data portion, the computer-implemented method being executable at a computer-implemented system comprising a server having a processor, the processor having a user space and a kernel space, the processor configured to perform the method, the method comprising:
receiving the user device request to process the user data portion from a user device;
upon receiving the user device request, reading the user data portion from a database at the server;
allocating space at the processor to define a sandbox environment, the sandbox environment defining a kernel space commands set of the processor to perform processing of the user data portion;
isolating the processor within the sandbox environment from the user space in order to perform isolated execution of the user device request by the kernel space commands set;
processing the user data portion within the sandbox environment;
de-isolating the sandbox environment from the user space by returning an indication of a processed user data portion;

writing the indication of the processed user data portion to the user space of the processor; and
the method further comprising:
upon receiving the user device request for the user data portion processing from the user device, determining that the user device request comprises the at least one non-standard command;
transmitting the user device request to a temporal processor space;
modifying, in the temporal processor space, the user device request for the user data portion processing, said modifying including translating the at least one non-standard command into at least one kernel space command of the kernel space command set;
transmitting the modified user device request to the kernel space of the processor; and
resuming with said reading the user data portion from the database at the server.

10. The computer-implemented method of claim 9, wherein isolating the processor comprises:
validating the user device request to process the user data portion, the user device request including an indication of the user data portion and at least one command to be executed to process the user data portion by the kernel space; and
adding executing the at least one command of the user device request to an execution line of the kernel space.

11. The computer-implemented method of claim 9, wherein the indication of the processed user data portion is the processed user data portion.

12. The computer-implemented method of claim 9, wherein the indication of the processed user data portion is a message to the user that the user data portion was not processed correctly.

13. The computer-implemented method of claim 9, wherein:
the processor is a first processor and a second processor;
the user device request is a first user device request to process a first user data portion and a second user device request to process a second user data portion; and wherein:
the first processor is configured to perform the processing of the first user device request to process the first user data portion, and
the second processor is configured to perform the processing of the second user device request to process the second user data portion.

14. The computer-implemented method of claim 13, wherein the first processor and the second processor are configured to be able to perform the computer-implemented method contemporaneously.

15. The computer-implemented method of claim 9, wherein said receiving the user device request for the user data portion processing from the user device comprises receiving the user device request for the user data portion processing from the user device via a compiling interface executed by the user device.

16. The computer-implemented method of claim 9, wherein said receiving the user device request for the user data portion processing from the user device comprises receiving the user device request for the user data portion processing from the user device via a command line interface executed by the user device.

* * * * *